Feb. 21, 1967  J. W. EDMING  3,305,108
SILAGE DISTRIBUTOR
Filed Oct. 11, 1965 2 Sheets-Sheet 2
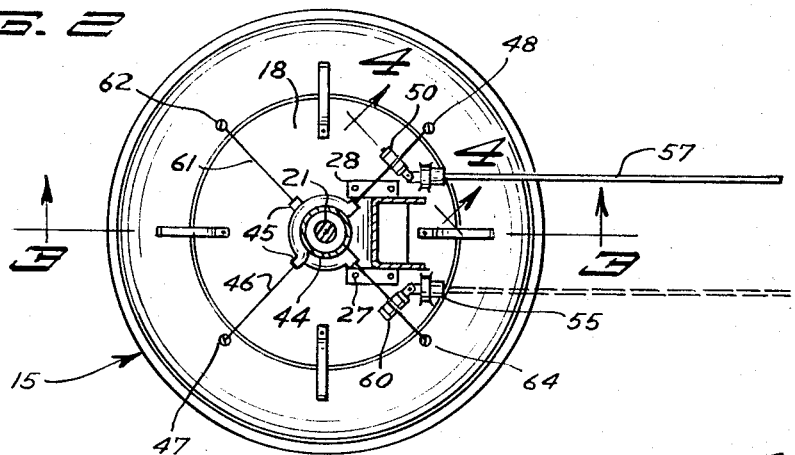
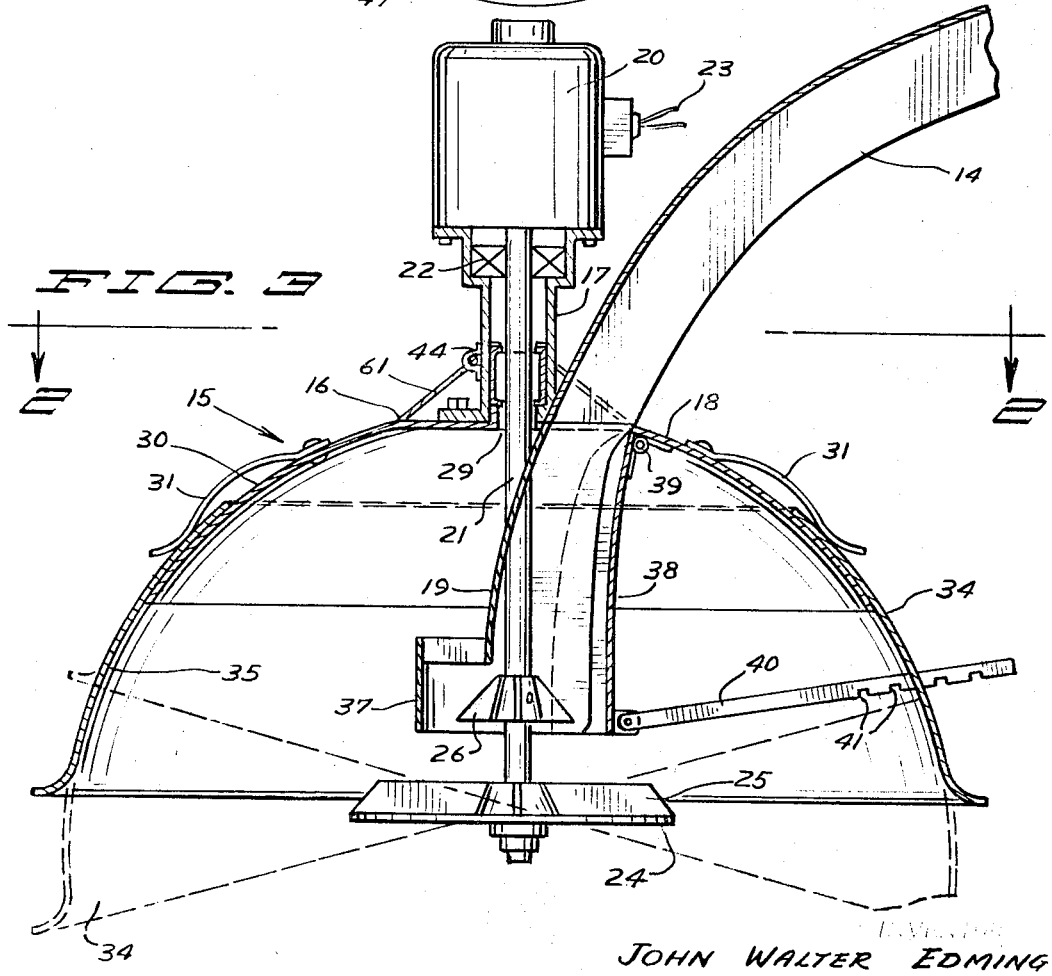
JOHN WALTER EDMING
BY
Carlsen, Carlsen & Sturm
ATTORNEYS 3,305,108
SILAGE DISTRIBUTOR
John Walter Edming, P.O. Box 83,
Glen Flora, Wis. 54526
Filed Oct. 11, 1965, Ser. No. 494,614
7 Claims. (Cl. 214—17)

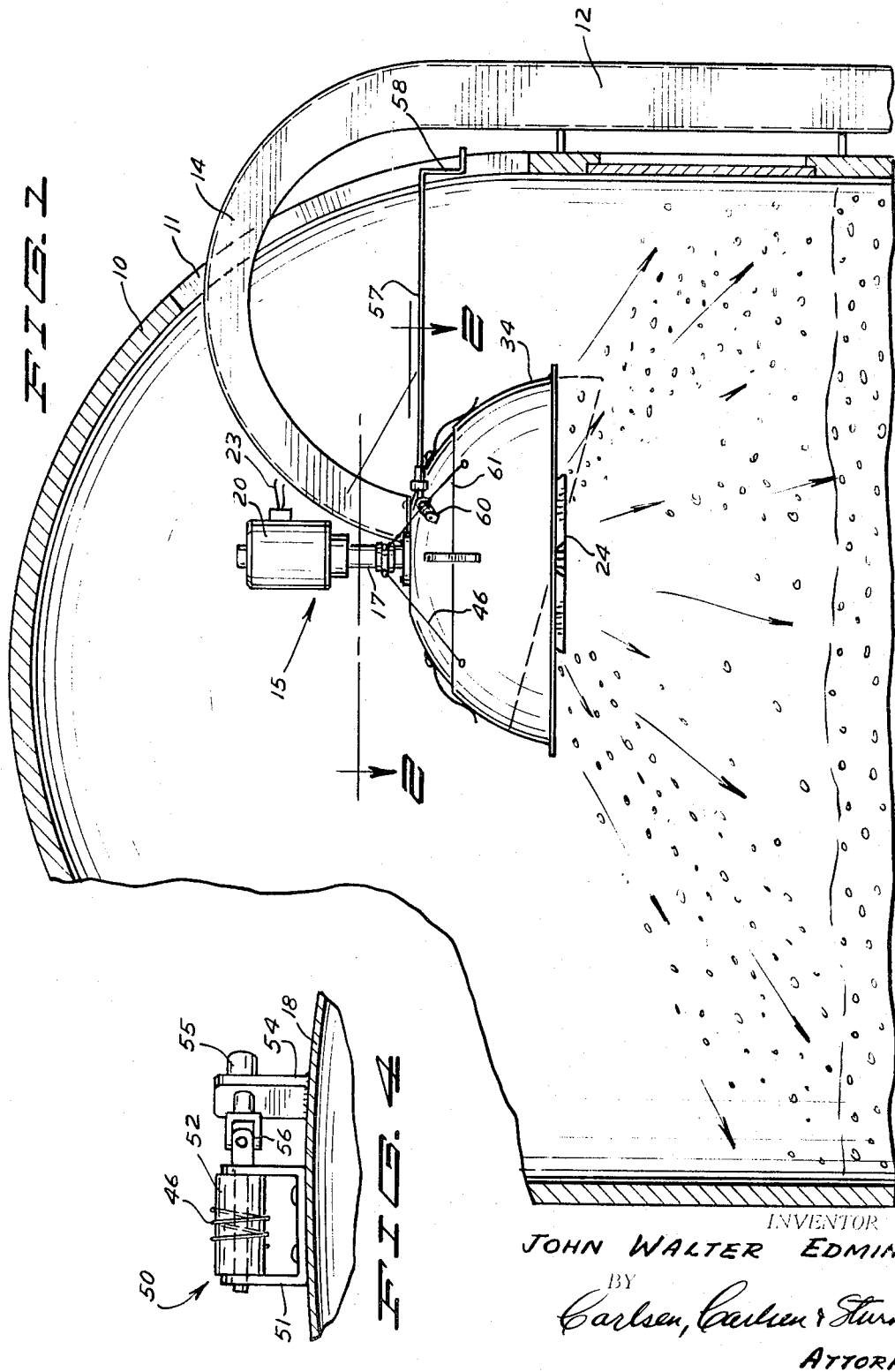

This invention relates to apparatus for uniformly distributing silage in a silo as the silo is filled.

In silo loading, uniform distribution of the silage is important so that uneven pressures are not imposed against the walls and so that the maximum storage capacity of the silo might be utilized. Perhaps of even greater concern is the fact that uneven distribution results in the formation of hard cores within the silage body and the separation of particles before fermentation. It is also found that modern silage unloading equipment performs much more efficiently where the silage body is of uniform consistency.

Attempts have been made to achieve uniform distribution by placing a rotary fan or plate below the discharge end of the conveyor pipe entering the top of the silo to toss the silage outwardly against the walls. While this concept is effective the rotary device alone does not provide the operator with any degree of directional control where for some reason uneven loading begins to occur. It is accordingly desirable to provide the operator of the silo filling equipment with some means for directing the silage in any selected radial direction from a centrally disposed rotary distributor.

Therefore, the primary object of the present invention is to provide a silage distributor having means for breaking up and distributing silage entering into the top of a silo and which allows the silo operator to selectively direct the silage from the distributor in any radial direction from the center of the silo.

Another object of the invention is to provide a silage distributor with a means for breaking up the silage prior to contact with the distributor means.

Still another and more specific object of the invention is to provide a silage distributor for mounting at the discharge end of a silo filler tube with a deflector means surrounding the distributor and mounted thereon for universal titling adjustment to deflect the silage from the distributor in any desired direction.

With the above mentioned and additional objects in view, the invention broadly comprises a frame for mounting on the end of a silage conveyor pipe, a rotary fan journaled on the frame for rotation on an upright axis within the top portion of a silo to radially distribute silage being discharged from the end of the pipe, a circular mounting skirt on the frame above the fan, and a deflector hood mounted on the skirt and depending downwardly in encircling relation to the fan, said hood mounted on the skirt for tilting movement about any horizontal axis so as to deflect silage from the fan in any desired radial direction, and control means for tilting the hood from outside of the silo.

The above mentioned and still additional objects of the invention will be brought to light during the course of the following specification, reference being made to the accompanying drawings, in which:

FIG. 1 is a side elevation of the distributor mounted at the end of a silo filler pipe extending into the upper portion of a silo and with the silo shown in vertical section.

FIG. 2 is a horizontal section through the distributor taken on line 2—2 of FIG. 1.

FIG. 3 is an enlarged vertical section through the distributor and filler tube taken on line 3—3 of FIG. 2.

FIG. 4 is an enlarged section taken on line 4—4 of FIG. 2 showing a portion of the deflector control mechanism in perspective.

Referring now more particularly to the drawings, reference numerals will be used to denote like parts or structural features in the different views. The numeral 10 denotes generally the top portion of a silo having an opening 11 therein through which the silo may be filled. A conventional silo filler pipe 12 extends upwardly along the outside of the silo 10 and then curves inwardly as at 14 through opening 11 to extend into the central portion of the silo. The distributor forming the subject of this invention is denoted generally at 15 and is mounted on the inner end of the filler pipe portion 14.

Turning now to FIG. 3, the distributor will be described in detail. A supporting unit or frame designated generally at 16 is integrally attached to the pipe 14. This unit comprises a tubular bearing housing 17, a skirt 18 and a discharge conduit 19 forming an extension of pipe 14. An electric motor 20 is mounted on the top of housing 17 and drives a shaft 21 which extends downwardly through the housing 17 being journaled therein by bearings 22 and through the discharge conduit 19. At its lower end the shaft 21 carries a distributor plate 24 having radially extending ribs 25. Beater blades 26 are mounted on shaft 21 within the conduit 19. The connection between spout 14 and the supporting unit 16 is effected by brackets 27 and 28 (FIG. 2) mounted on skirt 18 and which are securely connected to the spout. The skirt 18, provided with an opening 29 which mates with the shaft passageway, is secured to the member 17 as shown. This skirt has its upper surface 30 formed on the segment of a sphere, the center of which is located in the portion of shaft 21 upon which plate 24 is mounted. A plurality of downwardly opening spring clips 31 are mounted on the skirt and concentrically therewith and with shaft 21.

A deflector hood is denoted generally at 34. This hood has its interior surface 35 formed also on the segment of a sphere, such as surface 30, and on the same radius. Hood 34 rests upon the outer marginal portion of skirt 29 under clips 31 in overlapping relation to the skirt with the surfaces 30 and 35 in mating flush engagement.

Conduit 19 has an enlargement 37 at its lower end within which the shaft mounted beater 26 rotates. The outer wall 38 of the conduit is hinged as at 39 at its upper end and pivotally connected at its lower end to a handle 40 which extends outwardly through a slot in the deflector 34. The handle is notched as at 41 for loose locking with the deflector. Accordingly by operating handle 40 in and out the wall 38 may be adjusted to different positions to increase or decrease the interior dimension of conduit 19.

The interlocking engagement between the handle 40 and deflector 34 does not interfere with adjustment of the deflector hood subsequently to be described in view of the flexibility in the engagement and the fact that the handle pivot is very close to the axis of deflector movement.

As hereinbefore indicated, the deflector hood is adjustably mounted upon the skirt 18 for tilting movement to aid in directing material entering through pipe 14 to different parts of the silo. The control means for adjusting the deflector from outside of the silo will now be described, reference being made to FIGS. 1, 2 and 4.

A tubular collar 44 is mounted to extend around the housing 17. This collar has four radially extending and circumferentially spaced outlets 45. A first cable 46 has one end connected to the deflector 34 at 47 and extends into the collar 44 through the aligned outlet 45 then half way through the collar and out the diametrically opposite outlet 45 and back down to the deflector where it is connected to the deflector at point 48 which is diametrically opposite the connection 47. In its extension to connection 48 the cable 46 winds tightly around a small winch 50, the construction of which is but shown in FIG. 4. It includes a U-shaped bracket 51 mounted on skirt 18 and a roller 52 journaled for rotation in the bracket legs and having cable 46 wound thereon. A second bracket 54 on the skirt 18 journals a socket member 55 which has a universal joint connection at 56 with the roller 52. Socket member 55 is adapted to receive the end of an elongated crankshaft 57 having a handle 58 at its outer end.

A second cable 61 extends across the skirt 18 at right angles to the cable 46 with its central portion running through collar 44 and its ends connected to the deflector hood at 62 and 64 (FIG. 2). This cable is wound on a winch assembly 60 which is identical in construction to the winch 50 and having a socket member 55 also adapted to receive the crankshaft 57.

It will be understood that as the winch drum 52 is rotated in one direction through turning of shaft 57, the cable 46 will be pulled in one direction and released in the other to tilt the deflector hood in one direction about a horizontal axis extending crosswise of the cable. Conversely when the drum is rotated in a reverse direction the deflector will be tilted in the opposite direction about the same axis. On the other hand, when the winch 60 is operated to move the cable 61 the deflector may be tilted in opposite directions about a horizontal axis lying below and on a vertical plane with the cable 46.

As the deflector is tilted the inner surface 35 of the deflector moves along the outer surface of the skirt 30 with one portion of the deflector being raised under slips 31 by the cable pull while the diametrically opposite portion correspondingly lowers through gravitational pull.

It will be understood that by selective adjustment of the winches 50 and 60 to tilt the deflector about either or both of two relatively perpendicular horizontal axes the deflector can be tilted in any desired direction.

In operation, and in a normal situation where it is desirable to distribute the silage in a relatively even manner throughout the silo 10, the deflector is left in a horizontal position as shown in FIGS. 1 and 3. The motor 20 is energized to drive shaft 21 and the beater 26 and distributor fan 24 mounted thereon. As silage is blown or otherwise conveyed up through pipe 12 and inwardly through the curved portion 14 thereof it will descend through the conduit 19. As the material passes by beater 26 it will be broken up into loose particles before it falls upon the plate 24.

Distributor plate 24 rotates very rapidly and hurls the silage outwardly in all directions to glance off of the deflector hood 34 and then fall upon the silage bed or column. Plate 38 may be adjusted inwardly or outwardly to vary the pressure against the silage as it passes the beater 26.

It will be understood that during the silo loading operation the silage particles will be thrown outwardly against the outside walls to uniformly load the silo about the center line. This evenly distributes the silage pressure against the silo wall and prevents the build up of hard cores in the center of the silage mass. In the event that during loading the mass built up in one area fails to keep up with that in other areas, the operator can tilt the deflector 34 in any desired radial direction by operation of winches 50 and 60 so that the silage may be directed, as it leaves plate 24, primarily to said one area and thereby equalize the silage level throughout the silo. Two tilted positions of the deflector 34 are shown in broken lines in FIG. 3.

The lead wires 23 from the motor 20 extend to a suitable power source and a switching means (not shown) is provided on the outside of the silo for energizing or deenergizing the motor. When not in use the crank 57 may be hung on the silo adjacent to the opening 11.

The invention accordingly economically and effectively carries out the aforementioned objectives. It is understood that suitable modifications may be made in the structure as disclosed provided that such modifications come within the spirit and scope of the appended claims. Having now therefore fully illustrated and described my invention, what I claim as new and desire to protect by United States Letters Patent is:

1. In a silage distributor for mounting on the discharge end of a silo filler tube extending into the top portion of a silo, a frame adapted to be mounted on the tube, a shaft journaled on the frame for rotation on a vertical axis, a motor mounted on the frame and having driving connection with the shaft to rotate the shaft on its axis, a distributor mounted on the lower end of the shaft for rotation therewith, and a downwardly opening annular hood encircling the distributor and mounted on the frame for universal tilting movement about any horizontal axis to direct silage material from the distributor to any portion of the silo.

2. The subject matter of claim 1 wherein a conduit on the frame surrounds the shaft above the distributor and in communication with the tube, and a beater on the shaft within the conduit for breaking up silage passing from the tube downwardly through the conduit to the distributor.

3. The subject matter of claim 1 wherein said frame has a circular skirt mounted thereon coaxial with the shaft and said hood being formed on a spherical zone and being peripherally supported by said skirt for tilting movement about any horizontal axis.

4. The subject matter of claim 2 wherein the conduit is provided with one wall which is hingedly connected to the frame for movement toward and away from the shaft to adjust the size of the silage passageway through the conduit.

5. The subject matter of claim 1 wherein a tilt control means is mounted on the frame and connected to the annular hood for tilting the hood relative to the frame, and said control means having an operating handle extending laterally from the frame.

6. In a silage distributor for mounting on the discharge end of a silo loading pipe, a support including a mounting skirt having an annular surface on a spherical zone, a rotary fan journaled on the support with the axis thereof disposed on a radius of the spherical zone and extending through the center of the skirt, an annular deflector hood mounted on the skirt and having a surface universally engaging said skirt surface for tilting adjustment of the hood about any horizontal axis, said hood surrounding the fan to direct silage therefrom in any desired direction.

7. In a silage distributor, a support including a conduit having a vertical passage therethrough with a silage inlet at its uper end and a silage outlet at its lower end, a shaft journaled on the support and extending through the passage for rotation on a vertical axis, a beater member fixed to the shaft within the passage, a distributor member fixed to the shaft and spaced below said outlet, a motor on the support and having driving connection with the shaft above said inlet, an annular mounting skirt mounted on the conduit in encircling relation thereto, a downwardly opening annular deflector hood encircling the shaft and distributor member and having its upper portion mounted on the skirt for universal tilting movement, and a control means interconnecting the skirt and hood for effecting said tilting movement.

References Cited by the Examiner
UNITED STATES PATENTS

| | | | |
|---|---|---|---|
| 2,243,996 | 6/1941 | Baughman | 275—15 |
| 3,206,044 | 9/1965 | Schwichtenberg | 214—17 |

GERALD M. FORLENZA, *Primary Examiner.*

R. G. SHERIDAN, *Assistant Examiner.*